(12) United States Patent
Chi et al.

(10) Patent No.: US 7,035,343 B2
(45) Date of Patent: Apr. 25, 2006

(54) CLOSED LOOP TRANSMIT DIVERSITY ANTENNA VERIFICATION USING TRELLIS DECODING

(75) Inventors: Richard Chi, Temple City, CA (US); Jittra Jootar, Mountain View, CA (US); Parvathanathan Subrahmanya, Sunnyvale, CA (US)

(73) Assignee: Qualcomm Inc., San Diego, CA (US)

( * ) Notice: Subject to any disclaimer, the term of this patent is extended or adjusted under 35 U.S.C. 154(b) by 776 days.

(21) Appl. No.: 10/061,877

(22) Filed: Jan. 31, 2002

(65) Prior Publication Data

US 2003/0142755 A1    Jul. 31, 2003

(51) Int. Cl.
*H04L 5/12* (2006.01)
(52) U.S. Cl. ...................... 375/265; 375/358; 375/341; 375/347
(58) Field of Classification Search ................ 375/265, 375/259–261, 341, 340, 316, 377, 371–373, 375/354, 362–368, 358, 267, 319, 295, 219, 375/317, 347, 346; 455/101, 132, 91, 130; 370/509–514, 525, 526, 503, 498, 464, 522
See application file for complete search history.

(56) References Cited

U.S. PATENT DOCUMENTS

| | | | |
|---|---|---|---|
| 5,541,955 A * | 7/1996 | Jacobsmeyer | 375/222 |
| 6,377,610 B1 * | 4/2002 | Hagenauer et al. | 375/136 |
| 6,674,707 B1 * | 1/2004 | Ogura et al. | 369/59.22 |
| 6,857,101 B1 * | 2/2005 | Levy | 714/796 |
| 6,862,316 B1 * | 3/2005 | Tomisato et al. | 375/232 |
| 6,882,690 B1 * | 4/2005 | Berggren et al. | 375/265 |

\* cited by examiner

*Primary Examiner*—Pankaj Kumar
(74) *Attorney, Agent, or Firm*—Philip R. Wadsworth; Charles D. Brown; George C. Pappas

(57) ABSTRACT

A trellis decoder determines the most likely transmitted phase in response to previously requested phase adjustments and observed transmitted symbols. Maximum a posteriori (MAP) decoding also may be used. Alternatively, the identified likely transmitted phase is used for data demodulation. This and related features have the benefit of decreasing the effect of phase discrepancies introduced by erroneous reception of phase adjustment information, resulting in improved error rates, and a corresponding increase in system capacity, data throughput, or both.

19 Claims, 6 Drawing Sheets

CLOSED LOOP TRANSMIT DIVERSITY ANTENNA VERIFICATION USING TRELLIS DECODING

FIELD

The present invention relates generally to communications, and more specifically to a novel and improved method and apparatus for closed loop transmit diversity antenna verification using trellis decoding.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

One technique used to enhance performance, including system capacity and data throughput, is to lower the required transmit signal power by employing transmit diversity. Transmit diversity involves transmitting data on two or more antennas, where the geographical separation between the antennas leads to path loss characteristics that are independent from antenna to antenna. Thus, a receiving station can coherently combine signals from the transmit diversity antennas, and the noise introduced in the channel will not combine coherently, thus increasing the signal-to-noise ratio (SNR) received.

In some closed loop transmit diversity schemes, an example of which is proposed in the aforementioned W-CDMA specification, a mobile station sends phase adjustment information to the base station to adjust the phase of the signals being transmitted on one or more antennas. The phase can be adjusted such that when the signals from the various transmit antennas are received at the mobile station, they combine coherently. The mobile station uses the phase adjustment when demodulating forward link data. In accordance with the reverse link bit error rate, on occasion, the phase adjustment information will be incorrectly received at the base station. In response, the incorrect phase will be introduced to the data transmitted on the diversity antennas. If the mobile station does not recognize that the phase was not transmitted in accordance with the phase adjustment information, it will use the incorrect phase in demodulation, increasing the forward link error rate. This can be particularly troublesome at times when the reverse link bit error rate is relatively high.

Antenna verification techniques can be used to determine if the phase transmitted by the base station matches the phase requested by the mobile station. Improved antenna verification techniques allow for reduced forward link error rates for a given reverse link error rate, because the effect of an incorrectly received phase adjustment message can be reduced. There is therefore a need in the art for improved closed loop transmit diversity antenna verification.

SUMMARY

Embodiments disclosed herein address the need for closed loop transmit diversity antenna verification. In one aspect, a trellis decoder is used to determine the most likely transmitted phase in response to previously requested phase adjustments and observed transmitted symbols. In another aspect, maximum a posteriori (MAP) decoding is used. In yet another aspect, the identified likely transmitted phase is used for data demodulation. Various other aspects of the invention are also presented. These aspects have the benefit of decreasing the effect of phase discrepancies introduced by erroneous reception of phase adjustment information, resulting in improved error rates, and a corresponding increase in system capacity, data throughput, or both.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
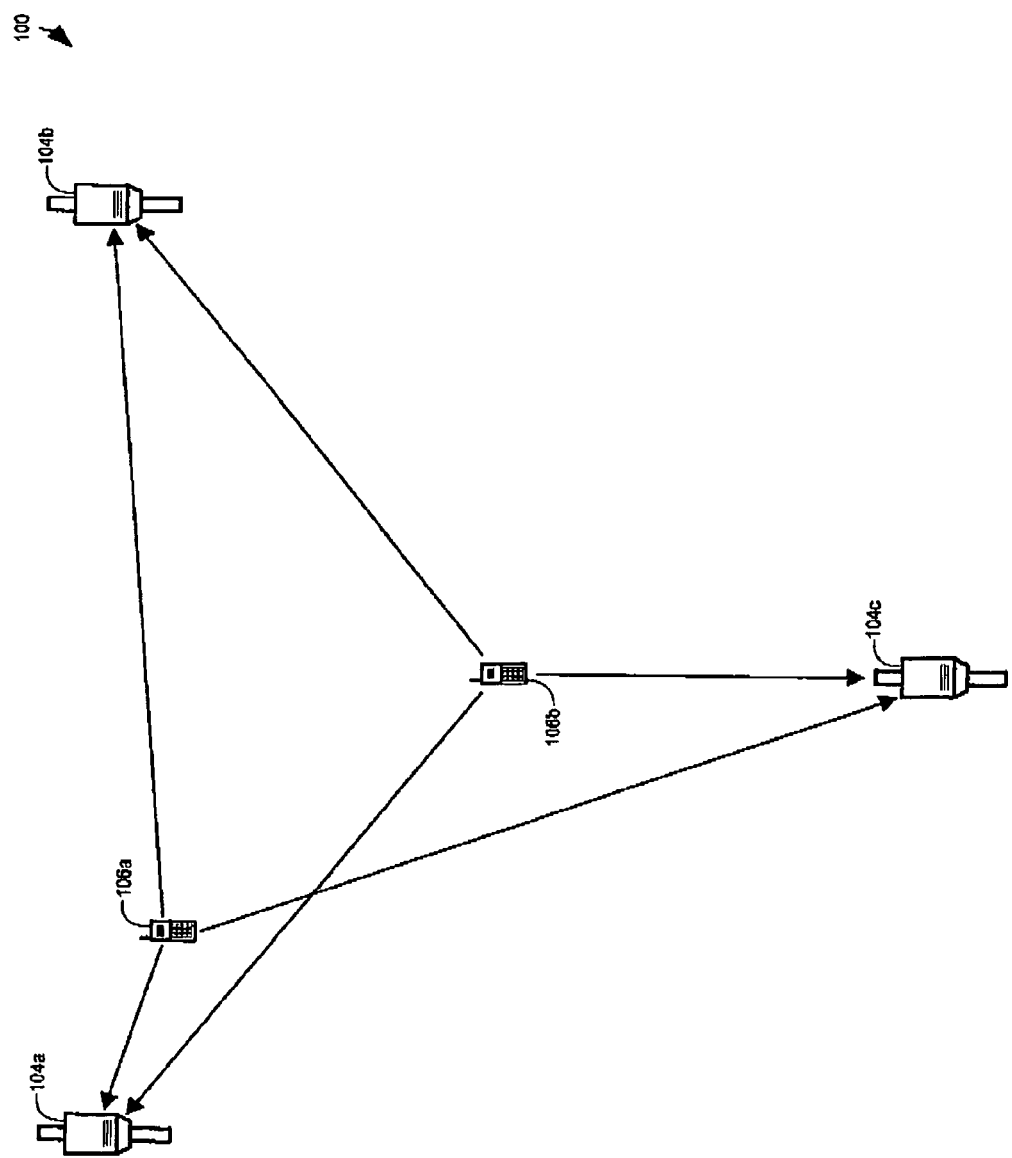
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
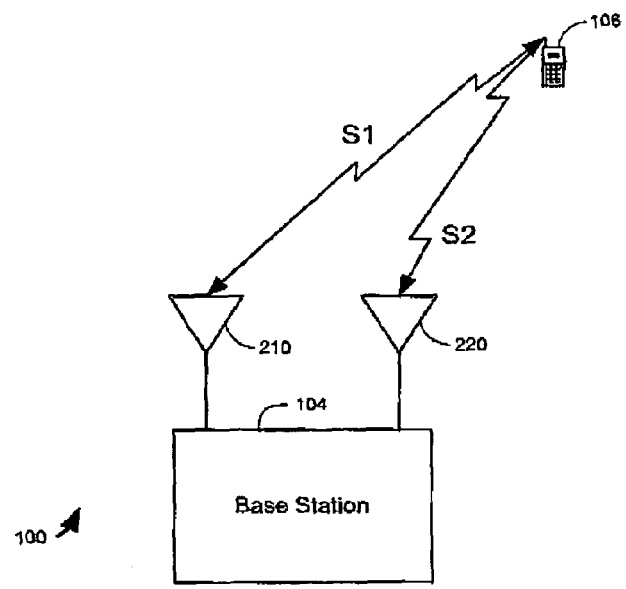
FIG. 2 depicts a portion of a wireless communication system with a base station and mobile station equipped for transmit diversity.

FIG. 2 shows an embodiment of system 100, detailing a transmit diversity scheme. Base station 104 is equipped with two antennas, 210 and 220, for communicating with mobile station 106. (Alternative embodiments may use more than two antennas.) The links between antennas 210 and 220 and mobile station 106 are labeled S1 and S2, respectively. The two antennas are located with enough geographical separation that the fading experienced on S1 is independent from the fading on S2, yet the two signals arrive at mobile station 106 at essentially the same time. Various techniques can be employed such that the two signals combine constructively at the mobile station, and in so doing combat some of the deleterious effects that would be introduced if only a single antenna were deployed.

One such scheme, detailed in the above referenced W-CDMA standard, is closed-loop transmit diversity. The phase of a signal, S2, transmitted on diversity antenna 220 is adjusted in relation to the signal, S1, transmitted on primary antenna 210 so that the two signals, S1 and S2, are in-phase and maximally combine when received at mobile station 106. The terms primary and diversity, applied to antennas 210 and 220, respectively, are used only to distinguish the two antennas. Those of skill in the art will recognize that phase adjustment can take place on either antenna (or on multiple antennas).

The adjustment introduced on the diversity antenna is determined at the mobile station 106 and transmitted to the base station 104. In some embodiments, only a finite number of increments will be supported for adjustment of the diversity antenna. As such, in some cases, S1 and S2 will not arrive exactly in phase at the mobile station. Instead, the phase adjustment is made such that S1 and S2 coherently combine to maximize the signal-to-noise ratio (SNR), out of the available adjustments, received at mobile station 106.

The mobile station 106 determines the phase adjustment for the next time period by measuring the signals, S1 and S2, received in the current time period. The phase adjustment is transmitted on the reverse link, and the base station 104 receives it. It is possible that the phase adjustment is received in error at base station 104. In such a case, the base station will transmit with a different phase than that anticipated by the mobile station. Even though the received combination of S1 and S2 in this case does not correspond to the combination requested, the signal can still be demodulated using the actual phase adjustment applied. The probability of error in receiving data from the base station increases whenever the mobile station demodulates using a phase other than the one transmitted. Therefore, as described above, antenna verification is used to determine which phase was actually transmitted by the base station. This is detailed further below.

Figure 3:
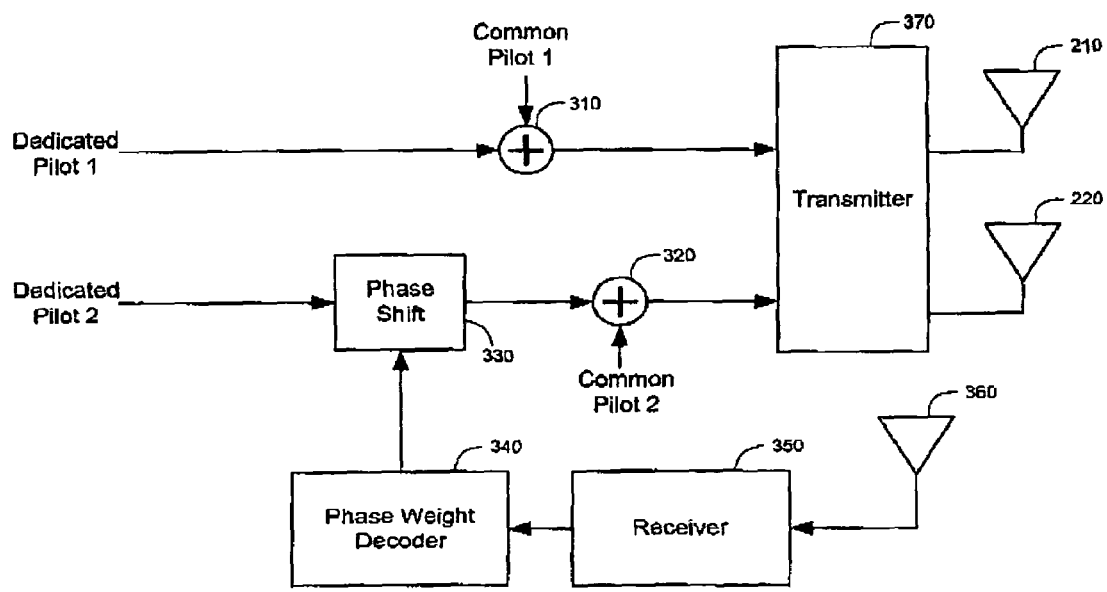
FIG. 3 depicts an embodiment of a base station.

FIG. 3 depicts a portion of an embodiment of a base station 104 for use in closed-loop transmit diversity. Common pilot 1 is summed with dedicated pilot 1 in summer 310, the result of which is delivered to transmitter 370 for transmission on primary antenna 210. In the exemplary embodiment, common pilot 1 is transmitted continuously, and can be used by a plurality of mobile stations within the cell. Dedicated pilot 1 is transmitted during a portion of a time slot of the control channel associated with the dedicated physical channel established between the base station and a particular mobile station. The combination of common pilot 1 and dedicated pilot 1 as a sum is exemplary only. Alternate embodiments may transmit the two pilots using time division multiplexing, summing, or a combination of both. Those of skill in the art will recognize that various forms of modulation can be applied to the pilot signals, before combination, or upon the combined signal. These modifications are anticipated by and fall within the scope of the present invention. Transmitter 370 may perform up-conversion, amplification, or other procedures well known in the art.

Dedicated pilot 2 is orthogonal to dedicated pilot 1, and is also used in a dedicated physical channel established between the base station 104 and a particular mobile station 106. Dedicated pilot 2 is delivered for phase adjustment in phase shift 330, the resulting phase-shifted dedicated pilot 2 is summed with common pilot 2 in summer 320. The resulting sum is delivered to transmitter 370 for transmission on diversity antenna 220. Common pilot 2 is orthogonal to common pilot 1. Various techniques for generating orthogonal signals for use in this embodiment are known in the art, examples of which are detailed in the W-CDMA specification. Hereinafter, common pilots 1 and 2 may be referred to as the common pilot, and dedicated pilots 1 and 2 may be referred to as the dedicated pilot. Which common or dedicated pilot is used will be clear from the context, in particular, on which antenna the pilot is transmitted.

The phase adjustment introduced in phase shift 330 comes from the mobile station 106 with which the base station 104 is communicating. A signal, containing the phase adjustment information, is received at antenna 360, and delivered to receiver 350 for any required down-conversion, amplification, etc., techniques for which are well known in the art. Those of skill in the art will recognize that antenna 360 is not required, one or more of the transmit antennas can also be used for receiving (details not shown). Receiver 350 also performs any required demodulation to extract the phase adjustment information from the received signal. The results are delivered to phase weight decoder 340, where a phase adjustment is determined and delivered to phase shift 330, for phase adjustment of the dedicated pilot as described above.

In addition to the pilot channels described, data is also transmitted on antennas 210 and 220. There are a variety of techniques for transmitting data using transmit diversity schemes known in the art. In the exemplary embodiment, the dedicated signals are phase shifted using phase shift 330, as described above, for transmission on the diversity antenna 220. The dedicated signals are not phase adjusted when transmitted on the primary antenna 210. The dedicated signals include the dedicated pilot described above, data for the mobile station 106 communicating on the dedicated channel, and other control signals specific to the dedicated channel. The details of the data transmission are not shown.

In one embodiment, the W-CDMA standard is supported. Those of skill in the art will recognize that the principles of the present invention are not limited to W-CDMA systems. In the W-CDMA standard, the common pilot is referred to as the common pilot channel (CPICH) and the dedicated pilot is referred to as the dedicated pilot channel (DPCH). The phase shift introduced in phase shift 330 is one of the four possibilities shown in the constellation of FIG. 4. A phase difference of 45°, 135°, 225°, or 315° is introduced, depending on the received signal from mobile station 106. The phase differences correspond to weighting the dedicated pilot by ½+j/2, −½+j/2, −½−j/2, or ½−j/2, respectively. A normalization factor can be multiplied to make the gain unity.

Figure 4:
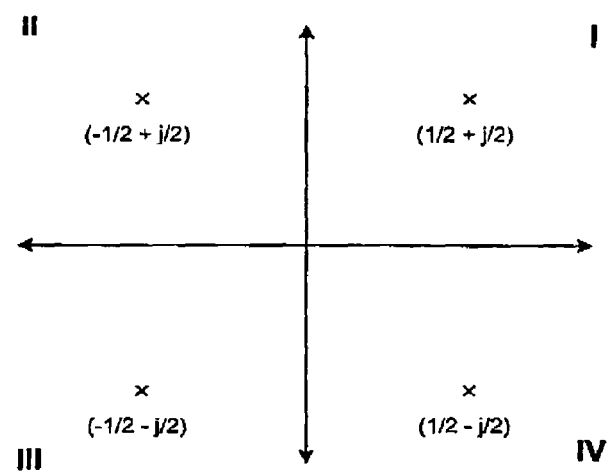
FIG. 4 depicts an exemplary phase constellation.

Since there are four possibilities, the phase weight can be represented with two bits. In one mode of the W-CDMA standard, the phase weight is transmitted one bit per slot, so that two slots are required to specify a particular weight. In even slots, the real part of the weight will be transmitted (1 or −1), and in the odd slots, the imaginary part (j or −j) will be sent. The base station 104, with phase weight decoder 340, will determine the weight for phase shift 330 based on the two most recently received slots. This method of transmitting the weight limits the movement of phases between points on the constellation. Referring to FIG. 4, it can be seen that in any one slot, the phase can only be adjusted to an adjacent quadrant. To move from one quadrant to one directly diagonal to it, both bits, requiring two slots, will need to be received.

Figure 5:
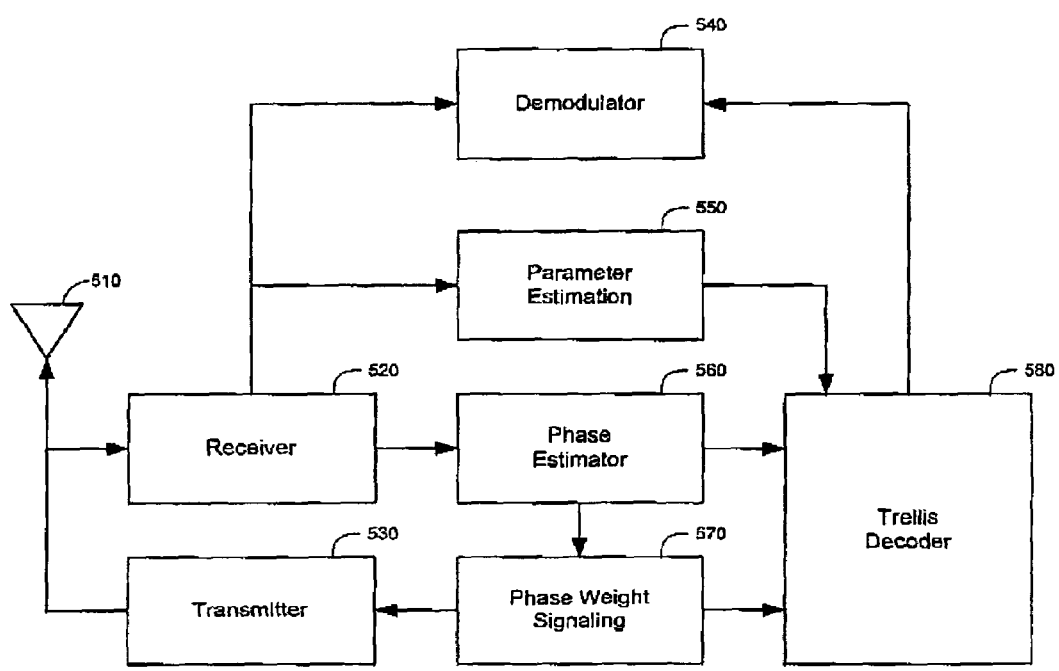
FIG. 5 depicts an embodiment of a mobile station.

FIG. 5 depicts an embodiment of a mobile station 106. For clarity, only a subset of the mobile station's components are shown. Signals are received at antenna 510, including signals from transmit diversity antennas and their associated multipath. In the exemplary embodiment, signals S1 and S2, described above, are received. The received signals are downconverted, amplified, filtered, etc., as needed, in receiver 520, using techniques known in the art. Signals S1 and S2 are delivered to phase estimator 560, where an estimate is made of the phase offset between the common pilot 1 and common pilot 2 embedded in them. In an alternative embodiment, any known signals that can be distinguished and identified from their respective transmitting antennas can be used to determine the phase difference between them.

The estimated phase is used by phase weight signaling block 570 to produce a signal or message to convey a phase adjustment request to the base station 104. The phase adjustment is calculated so that when introduced at the base station, S1 and S2 will have essentially the same phase when they arrive at the mobile station 106. The phase adjustment request is delivered to transmitter 530 for any required modulation, amplification, upconversion, etc., for delivery to the base station via antenna 510. Various modulation and upconversion techniques are known in the art, examples of which are given in the above referenced standards.

Trellis decoder 580 is deployed for antenna verification. It receives various channel estimates, derived from the received signal, from phase estimator 560. It receives the requested phase adjustments for the base station from phase weight signaling block 570. Parameter estimation 550 provides various parameter estimates to trellis decoder 580, such as scaling. In the exemplary embodiment, parameter estimation 550 is a power control block. Parameter estimation 550 monitors signals from receiver 520 and makes power control adjustment requests (details not shown). Parameter estimation 550 can be used for estimating the transmitted power of signals on the forward link. Alternate embodiments may use other means for determining scaling. Received power, noise, traffic-to-pilot ratio, and other parameters, may all be estimated using loops that are completely independent from power control. They may be estimated using algorithms similar to those used in power control, but may incorporate parameters specific to antenna verification.

Various trellis decoding techniques are known in the art, any of which, when deployed for antenna verification, fall within the scope of the present invention. Examples of trellis decoding include Viterbi decoding and maximum a posteriori (MAP) decoding. Viterbi decoding is often used when state transitions in a trellis are equally likely. MAP decoding is often used when the probability of transition among states is uneven. In the exemplary embodiment, supporting W-CDMA closed loop transmit diversity, the transition probabilities are uneven, so MAP decoding may be appropriate (this embodiment will be further detailed below). Those of skill in the art will recognize that any trellis decoder can be used for trellis decoder 580.

Once trellis decoder 580 has determined the most likely phase transmitted by the base station, that phase is delivered to demodulator 540 for demodulating symbols from receiver 520.

Mobile station 106 may deploy a digital signal processor (DSP), or other general purpose processor to perform the various functions described. In the alternative, some tasks may be performed in dedicated hardware, and some in a DSP or other processor. Various alternative configurations of DSP/dedicated hardware will be clear to those of skill in the art and fall within the scope of the present invention. A memory may be deployed in conjunction with or embedded within the DSP or other processor for performing the various functions and methods described herein, the steps being carried out entirely within the DSP or under control thereby. These details are not shown.

Figure 6:
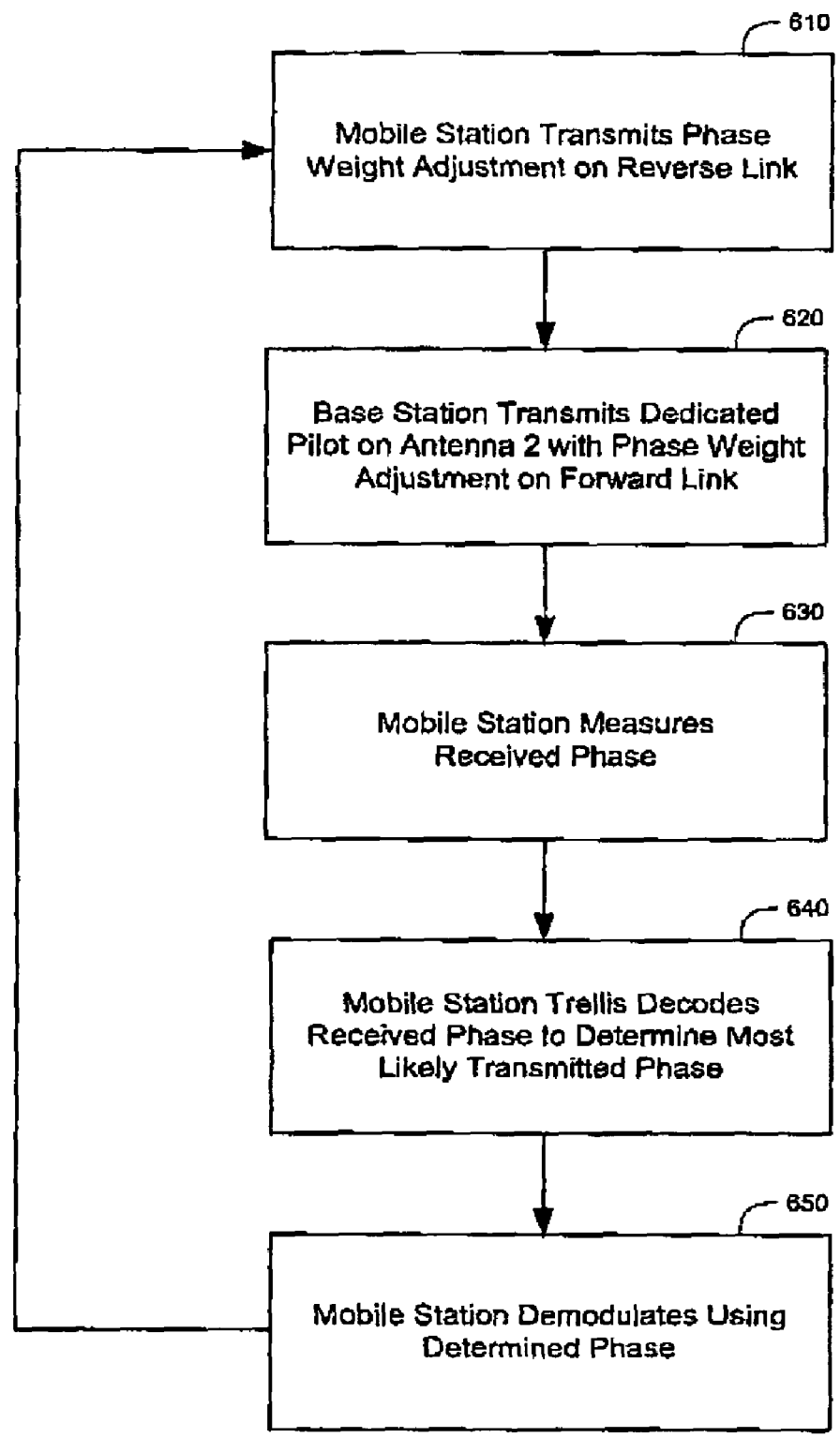
FIG. 6 depicts a flowchart of an embodiment of a method for closed loop transmit diversity antenna verification using trellis decoding.

FIG. 6 depicts a flowchart of an embodiment of a method for closed loop transmit diversity antenna verification using trellis decoding. In step 610, the mobile station transmits a phase weight on the reverse link. During initialization, a default phase weight may be prescribed. In the W-CDMA standard, 1+j is the initial phase weight for adjusting signals on the diversity antenna. Proceed to step 620, where the base station transmits the dedicated pilot (dedicated pilot 2) on the diversity antenna (i.e. antenna 220), on the forward link, using the phase weight adjustment received. Note that errors may have been introduced during transmission of the phase weight on the reverse link, causing the phase transmitted to be different from the phase requested. Proceed to step 630, where the mobile station measures the phase received. Proceed to step 640, where the mobile station trellis decodes the received phase to determine the most likely transmitted phase, given the observed (received) phase and the requested phases prior to it. Proceed to step 650, where the mobile station demodulates using the phase determined in step 640. Proceed back to step 610 and continue the loop as necessary.

The W-CDMA standard identifies two approaches for antenna verification, neither of which use trellis decoding. The first approach is to implement a four-hypothesis test each slot. The most likely phase is associated with the most probable hypothesis. The second approach is to assume the mobile station has correctly estimated the phase corresponding to the previous slot, and then the four-hypothesis test can be reduced to a two-hypothesis test. This is due to the fact that the phase rotation from slot to slot is limited to at most a 90 degree rotation per slot, as discussed above.

The four-hypothesis approach is computationally straightforward. However, it does not take into account the a priori probabilities of each hypothesis, which is based on the uplink, or reverse link, error rate and the past observations of the received phase differences. The two-hypothesis test utilizes the uplink error rate to weight the hypotheses, but ignores the past observations, thus leading to biased estimates of the true a priori probabilities. Furthermore, a decision error in the current slot will result in erroneous phases in both the current and next slot, since each decision assumes that the previous decision was correct.

By obtaining better approximations for the a priori probabilities of each of the four hypotheses for every slot, the error probability in deciding the phase can be expected to be lower. This can be achieved by observing not only the pilot symbols in the current slot to estimate the phase, but using information from pilot symbols from other slots as well. For example, instead of deciding the current slot phase based only on the dedicated and common pilot symbols for the current slot, we can calculate the joint a posteriori probability of each hypothesis of the current slot using the pilots of the current slot as well as the previous and/or future slots. Future slots can be made accessible by buffering the current data symbols until the subsequent (i.e. future) pilot symbols are available. Such buffering is well known in the art, details of which are not shown. In one embodiment, detailed further below, the a posteriori probabilities are estimated by considering the pilot symbols from some limited number of other slots, past or future.

In the limit, the a posteriori probability of the phase of the current slot can be calculated by observing the pilot symbols of all received slots. Unfortunately, the number of hypotheses increases exponentially with the number of slots used to make a decision, and hence the brute-force correlation method over all possible hypotheses can only be applied for a small number of total slots. However, using a trellis decoding algorithm like the maximum a posteriori (MAP) algorithm, which is well known in the art, the complexity can be kept proportional to the number of states. Using the MAP algorithm allows the pilot symbols from all the received slots to be considered in estimating the a posteriori probability.

Figure 7:
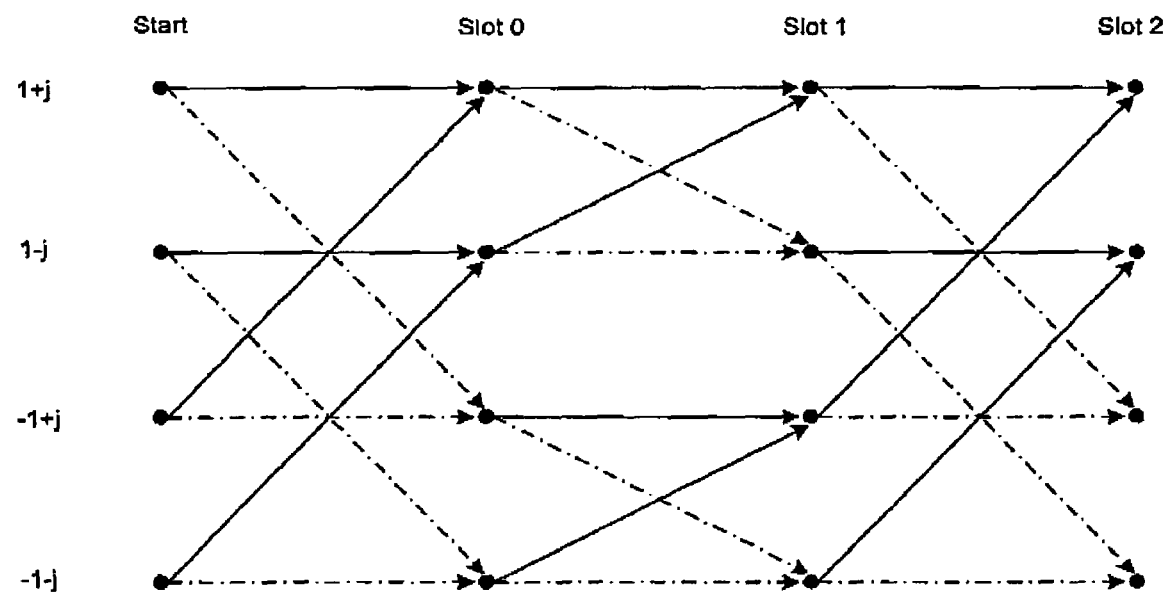
FIG. 7 depicts an exemplary phase state trellis.

For example, the W-CDMA closed loop transmit diversity signal, described above, can be thought of as a convolutional code with four states, represented in the trellis of FIG. 7. The four states are identified by the four possible phases, 1+j, 1−j, −1+j, and −1−j. The possible state transitions are shown, with the solid lines indicating that the uplink phase adjustment signal is 1, and broken lines indicating when the uplink phase adjustment signal is −1 (recall that in even slots the real portion of the phase is updated and the imaginary part is updated in odd slots). The W-CDMA standard specifies that the starting point is always 1+j, even though other transitions are shown between the nodes labeled "start" and those labeled "slot 0".

From the MAP algorithm, the best way to make a decision of the state, s, is to compare the probability that the signal is in each state given the y inputs received, P(s|y), producing the same result as comparing P(s,y). The MAP algorithm, adapted for use with antenna verification, using the W-CDMA signals as an exemplary embodiment, is detailed below. Two embodiments are considered. The first embodiment includes a means to buffer the incoming pilot and data symbols, phase adjustment bits transmitted on the uplink, and related information (the required information depends on the particular embodiment—one example is to buffer power control bits, used in computation of the branch metric, described below). This allows for the incorporation of pilot symbols of future slots in calculations for a present slot. The second embodiment does not incorporate future slot information, but makes a decision on the most likely transmitted phase based solely on the present and past observations.

Equation 1, below, gives $P_t(s,y)$, which is the probability of a state, s, where the state corresponds to a certain transmitted phase, given all observed received symbols, y, at a certain time t.

$$P_t(s, y) = \sum_{s'} FSM_{t-1}(s') * BM_t(s', s) * BSM_t(s) \qquad (1)$$

$FSM_{t-1}(s')$ is the forward state metric, or probability that the signal is in state s' at slot t−1, as computed from all observations y up to slot t−1. $BM_t(s',s)$ is the branch metric, or probability that signal goes to state s at slot t when in s' at slot t−1. $BSM_t(s)$ is the backward state metric, or probability that the state at slot t is s, as computed from all observed symbols y received at slot t and thereafter. The forward state metric values, $FSM_{t-1}(s')$, can be computed recursively using equation 2:

$$FSM_\tau(s) = \sum_{s'} FSM_{\tau-1}(s') * BM_\tau(s', s) \qquad (2)$$

For an embodiment supporting W-CDMA closed loop transmit diversity, described above, equation 3 provides $FSM_{-1}(s)$ to initialize the recursion to solve $FSM_0(s)$.

$$FSM_{-1}(s) = 1, s = 1 + j \qquad (3)$$
$$= 0, \text{otherwise}$$

Equation 3 holds because the W-CDMA standard provides that the starting phase is fixed at 1+j.

The backward state metric values, $BSM_t(s)$, can be computed recursively using equation 4:

$$BSM_{\tau \geq M}(s) = \sum_{s''} BSM_{\tau+1}(s'') * BM_{\tau+1}(s, s'') \qquad (4)$$

Here, s" denotes a possible next state to which the current state s can transition. In some embodiments, a termination sequence may be used to periodically ensure a known state is entered, for example, adding tail bits. The W-CDMA standard does not so provide. In the alternative, it may be assumed that, in steady state, all the states are equally probable. Various embodiments may call for differing number of slots required to reach steady state. The number of slots required to reach steady state is denoted in equation 4 as M. In one embodiment, M is 30 slots (corresponding to two W-CDMA frames). The recursion of equation 4 can be initialized using equation 5:

$$BSM_{t+T}(s'') = 0.25 \quad (5)$$

T is the number of slots for which buffering is supported by the embodiment.

In the exemplary embodiment, the branch metric can be calculated assuming additive white Gaussian noise (AWGN) on the dedicated pilot, and de minimus noise on the common pilot. (The accuracy of this assumption depends on the quality of the common pilot filter.) Under these assumptions, the branch metric can be calculated according to equation 6:

$$BM_t(s', s) = \frac{ULP_t(s', s)}{2\pi\sigma_{NDP}^2} \exp\left(\frac{-|d - \alpha pw|^2}{2\sigma_{NDP}^2}\right) \quad (6)$$

Equation 6 can re-written as shown in equation 7:

$$BM_t(s', s) = \frac{ULP_t(s', s)}{2\pi\sigma_{NDP}^2} \exp\left(\frac{-|d|^2 - |\alpha pw|^2 + 2\alpha \text{Re}(d * pw)}{2\sigma_{NDP}^2}\right) \quad (7)$$

$ULP_t(s',s)$ is the probability that state s' transitions to s, given the actual phase adjustment that was requested on the uplink. In the embodiment shown in FIG. 5, trellis decoder 580, configured as a MAP decoder, can receive the uplink requested phase adjustments from phase weight signaling block 570. There are three cases to consider in the exemplary embodiment. First, $ULP_t(s',s)$ is the probability of uplink bit error (the uplink bit error rate can also be used) if, in order to go from s' to s, the uplink signal must have been received incorrectly. Second, $ULP_t(s',s)$ is the probability that the uplink was received correctly, 1—uplink bit error rate, whenever the uplink signal must have been received correctly to go from s' to s. Finally, $ULP_t(s',s)$ is zero whenever it is impossible to go from s' to s for the given slot (for example, an attempt to move diagonally on the constellation depicted in FIG. 4). Note that the uplink bit error rate may change throughout a communication session. In one embodiment, the bit error rate may be updated using error rate calculations generated for power control commands (delivered from parameter estimation 550 to trellis decoder 580, depicted in FIG. 5, for example). The characteristics of various embodiments may produce various uplink bit error rates. In the exemplary embodiment, the steady state uplink bit error rate may be around 0.04.

The other variables used in equations 6 and 7 are defined as follows:

$\sigma_{NDP}^2$ = variance of noise, per dimension, in the dedicated pilot. This number may be obtained from the noise estimate used in power control.

$\alpha$ = a real scaling factor defined as the dedicated pilot amplitude over the common pilot amplitude. This scaling factor may be obtained a number of ways, examples include:

1) estimated from the sqrt($SNR_{ded\ pilot}$/$SNR_{common\ pilot}$), scaled appropriately for spreading factor, integration length differences, and the like, between the common and dedicated pilots,
2) derived from power control commands sent in the uplink, and knowledge of initial common pilot/dedicated pilot power difference, or
3) a combination of these approaches.

d = a diversity antenna complex channel estimate calculated from dedicated pilot. This value should have the effect of the phase applied from the base station.

p = a diversity antenna complex channel estimate calculated from the common pilot.

w = phase of the state. In the exemplary embodiment the phases include $\left\{\frac{1}{\sqrt{2}} + \frac{j}{\sqrt{2}}, \frac{1}{\sqrt{2}} - \frac{j}{\sqrt{2}}, -\frac{1}{\sqrt{2}} + \frac{j}{\sqrt{2}}, -\frac{1}{\sqrt{2}} - \frac{j}{\sqrt{2}}\right\}$.

$P_t(s,y)$, defined in equation 1, for all s, can be compared and the phase with the maximum probability can be chosen and used for demodulation. Referring back to FIG. 5, the phase can be delivered from trellis decoder 580 for use in demodulation in demodulator 540.

The foregoing discussion of equations 1 through 7 took place in the context of the first embodiment equipped for buffering to provide future slot information in present slot calculations. The second embodiment, mentioned earlier, is one in which buffering is not deployed, and the transmitted phase likelihood estimation is based on present and past observations only. In this embodiment, the backward state metric equations are not needed (equations 4 and 5, above). The forward state metrics and branch metrics can be calculated, as described above, with respect to equations 2–3 and 6–7, respectively. In this embodiment, the transmitted phase likelihoods, Pt(s,y), are calculated according to equation 8:

$$P_t(s, y) = \sum_{s'} FSM_{t-1}(s') * BM_t(s', s) \quad (8)$$

Contrasting equations 1 and 8, equation 8 can be viewed as assuming that the backward state metrics, $BSM_t(s)$, are equal for all the states. This may be an appropriate assumption without knowledge of the probabilities of the states in the future.

In this embodiment, $P_t(s,y)$, defined in equation 8, for all s, can be compared, and the phase with the maximum probability can be chosen and used for demodulation. As with the previous embodiment, referring back to FIG. 5, the phase can be delivered from trellis decoder 580 for use in demodulation in demodulator 540.

Figure 8:
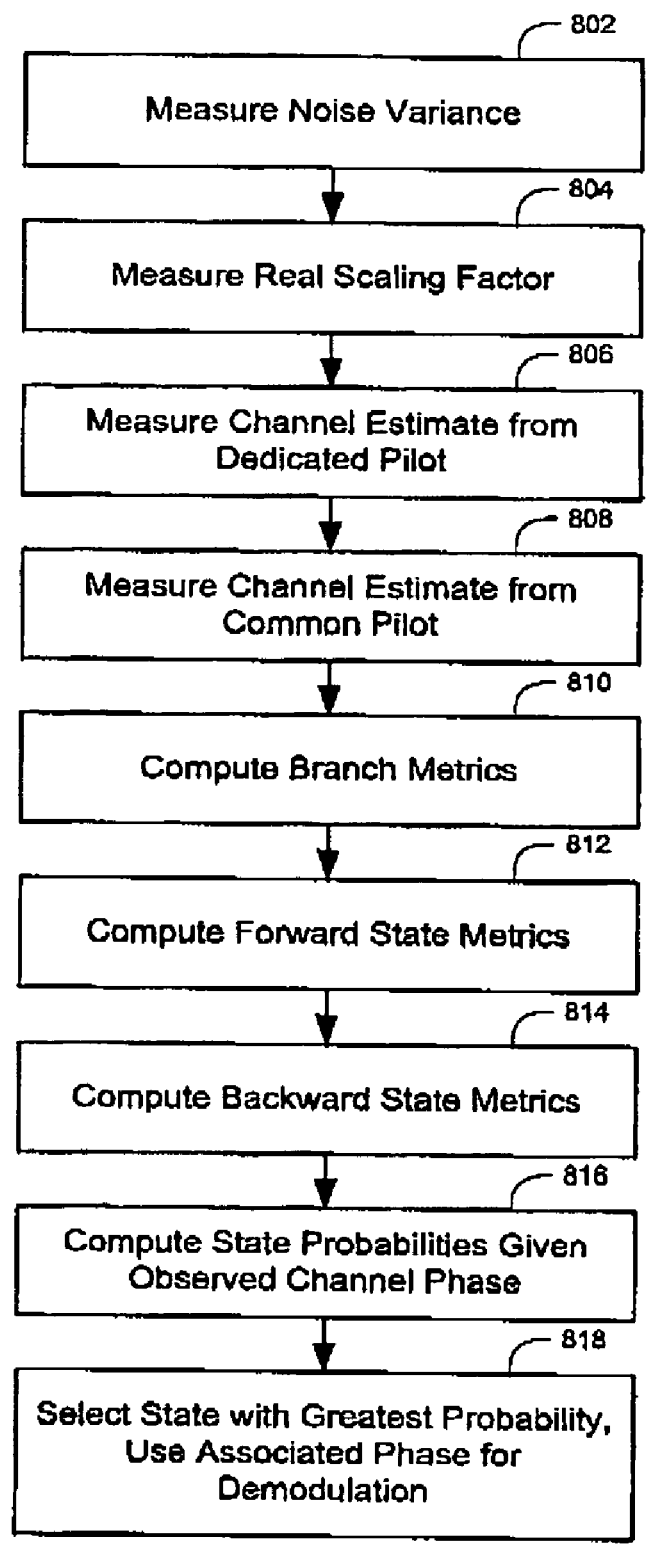
FIG. 8 depicts a flowchart of an embodiment of a method for closed loop transmit diversity antenna verification using MAP decoding.

FIG. 8 depicts a flowchart of an embodiment of a method for closed loop transmit diversity antenna verification using MAP decoding. In step 802, measure the noise variance. In step 804, measure the real scaling factor. In step 806, measure the channel estimate from the dedicated pilot. In step 808, measure the channel estimate from the common pilot. Steps 802–808 are essentially sub-steps of step 810, where branch metrics are computed. The four measurements in step 802–808 may be independent, and thus the order in which the measurements are made is not important. The previous discussion related to equations 1–8 provide various options for calculating or measuring parameters required for branch metric calculations for closed loop transmit diversity antenna verification. Alternate embodiments can perform correspondingly alternate steps for the branch metric calculation step, 810. Branch metrics can be calculated according to equation 6 or 7, above. Various means for calculating branch metrics are known in the art and are anticipated for use within this embodiment.

From the branch metrics, compute the forward state metrics in step 812. The forward state metrics can be calculated according to equations 2 and 3. Also from the branch metrics, the backward state metrics can be computed in step 814. Step 814 is not used if a means for including future observations in present state calculations, such as buffering, is not included. Backward state metrics can be calculated according to equations 4 and 5. It can be seen that steps 812 and 814 are not interdependent, and so the order of processing the two steps is not important.

In step 816, compute the state probabilities given the observed channel phase. This can be computed as described with relation to equation 1 in one embodiment, and as described with relation to equation 8 in an alternate embodiment.

In step 818, select the state with the greatest probability. Use the phase associated with that state for demodulation. A variety of demodulation techniques are known in the art, any of which can be incorporated in the embodiments disclosed herein. In one embodiment, estimates of the channel seen by signals from one antenna and the channel or channels seen by one or more diversity antennas are made. Then the diversity channels are multiplied by their respective phase offsets in relation to the first channel, and summed with the estimate of the first channel, to produce a channel estimate. The two antenna situation is described in equation 9:

$$\text{Channel estimate} = \text{antenna 1 channel estimate} + \text{antenna 2 channel estimate} * \text{phase} \quad (9)$$

The received signal can be multiplied by the conjugate of the channel estimate for use in demodulation. Variations and alternate demodulation techniques employing the phase can be implemented within the scope of the present invention.

The exemplary demodulation technique combines the two common pilots (according to received signal strength), rotated according to their antenna-verified phase offset with respect to the dedicated channels. This essentially produces a complex weighted sum. The complex weighted sum is then used for demodulating the dedicated data. Demodulation includes dot and cross multiplication, and other procedures well known in the art.

Certain variations can be applied to the MAP algorithm disclosed herein. For example, the summation in equation 1 and equation 8 can be replaced to keep track of only the maximum probability, not the sum of all the probabilities (known as the Max Log MAP algorithm). Other methods include look-up tables to adjust for the error in the Max Log approximation, or using a soft-output Viterbi decoder to obtain the a posteriori probability of each state. It should also be noted that computation of the metrics in the MAP algorithm is traditionally done in the log domain to reduce complexity.

Note that the foregoing discussion has used the signals, codes and parameters defined in the W-CDMA standard as some of the exemplary signals, codes and parameters. This is for clarity of discussion only, and should not be construed to limit the scope of the present invention to W-CDMA systems. The principles of the present invention apply to any conceivable system that employs closed loop transmit diversity antenna verification. Various combinations of pilot and data encoding schemes for diversity transmission with antenna verification are anticipated and fall within the scope of the present invention. The present invention applies to FDMA and TDMA systems as well as CDMA systems. Those skilled in the art will recognize how to adapt the various embodiments described for use with such alternate systems.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile station, operable with a base station transmitting from a plurality of antennas, the base station adjusting the phase of signals on one or more of the plurality of antennas in response to mobile-station originated phase adjustment requests, comprising:
    a trellis decoder for determining a phase received in response to the phase adjustment requests, wherein the trellis decoder is a maximum a posteriori (MAP) decoder;
    a phase estmator for estimating phases of pilot signals, the pilot signal phase estimates used in branch metric calculations within the MAP decoder; and
    a phase weight signaling means for producing phase adjustment request messages in response to the pilot signal phase estimates for transmission to the base station and for use in branch metric calculations within the MAP decoder.

2. The mobile station of claim 1, further comprising a parameter estimation means for estimating received power, the received power estimate used in branch metric calculations within the MAP decoder.

3. The mobile station of claim 2, wherein the parameter estimation means is a power control means.

4. The mobile station of claim 1, further comprising a demodulator for demodulating a received signal using the phase determined in the trellis decoder.

5. The mobile station of claim 1, further comprising a buffer for storing received samples and phase adjustment requests, the stored received samples and phase adjustment requests used in backward state metric calculations within the MAP decoder.

6. A method of transmit diversity antenna verification, comprising:
    estimating phases of pilot signals to produce pilot signal estimates;
    generating phase adjustment signals in response to the pilot signal estimates;
    transmitting the phase adjustment signals to a remote station;
    trellis decoding the pilot signal estimates to identify the transmitted phase, using the phase adjustment signals, wherein the trellis decoding uses MAP decoding, the pilot signal estimates for use in MAP branch metric calculations; and
    demodulating the received signals using the identified phase.

7. The method of claim 6, further comprising buffering the received signals and phase adjustment signals, and wherein the trellis decoding further uses the buffered received signals and phase adjustment signals.

8. A method of transmit diversity antenna verification, comprising:
    transmitting phase adjustment signals;
    measuring the phase of received signals adjusted in response to the phase adjustment signals;
    trellis decoding the received signal phases to identify the transmitted phase, using the phase adjustment signals; and demodulating the received signals using the identified phase; and wherein the trellis decoding comprises calculating a branch metric for transitioning from a state s' to a state s, the branch metric a function of:
    the probability of transitioning from s' to s;
    the noise in a dedicated pilot;
    a scaling factor proportional to the ratio of the dedicated pilot to a common pilot;
    a dedicated pilot channel estimate;
    a common pilot channel estimate; and
    a phase included in a phase adjustment signal.

9. The method of claim 8, wherein the probability of transitioning from s' to s is:
    the uplink bit error rate when an s' to s transition requires a phase adjustment signal error;
    1—uplink bit error rate when an s' to s transition requires a phase adjustment signal received correctly; and
    0 when an s' to s transition is not a valid trellis transition.

10. The method of claim 8, wherein the noise in the dedicated pilot is obtained from a power control noise estimate.

11. The method of claim 8, wherein the scaling factor is obtained as a function of the ratio of the signal to noise ratio (SNR) of a dedicated pilot to the SNR of a common pilot.

12. The method of claim 8, wherein the scaling factor is obtained from power control commands.

13. The method of claim 8, wherein the dedicated pilot channel estimate is obtained by estimating the channel through which a dedicated pilot was transmitted from a diversity antenna.

14. The method of claim 8, wherein the common pilot channel estimate is obtained by estimating the channel through which a common pilot was transmitted from a diversity antenna.

15. The method of claim 8, further comprising:
    calculating a probability for each of the set of possible phases and selecting the largest probability for identifying the phase for demodulation therewith.

16. The method of claim 8, wherein the branch metric, $BM_t(s',s)$, is calculated as:

$$BM_t(s',s) = \frac{ULP_t(s',s)}{2\pi\sigma_{NDP}^2} \exp\left(\frac{-|d - \alpha pw|^2}{2\sigma_{NDP}^2}\right);$$

wherein:
    $ULP_t(s',s)$ is the probability of transitioning from s' to s;
    $\sigma NDP^2$ is the noise, per dimension, in the dedicated pilot;
    $\alpha$ is the scaling factor proportional to the ratio of the dedicated pilot to the common pilot;
    d is the dedicated pilot channel estimate;
    p is the common pilot channel estimate; and
    w is the phase included in a phase adjustment signal.

17. An apparatus, operable with a base station using transmit diversity, comprising:
    means for estimating phases of pilot signals to produce pilot signal estimates;
    means for generating phase adjustment signals in response to the pilot signal estimates;
    means for transmitting the phase adjustment signals to a remote station;
    means for trellis decoding the pilot signal estimates to identify the transmitted phase, using the phase adjustment signals, wherein the trellis decoding uses MAP decoding, the pilot signal estimates for use in MAP branch metric calculations; and
    means for demodulating the received signals using the identified phase.

18. Processor readable media operable to perform the following steps:
  estimating phases of pilot signals to produce pilot signal estimates;
  generating phase adjustment signals in response to the pilot signal estimates;
  transmitting the phase adjustment signals to a remote station;
  trellis decoding the pilot signal estimates to identify the transmitted phase, using the phase adjustment signals, wherein the trellis decoding uses MAP decoding, the pilot signal estimates for use in MAP branch metric calculations; and
  demomodulating the received signals using the identified phase.

19. A wireless communication system including a mobile station, operable with a base station transmitting from a plurality of antennas, the base station adjusting the phase of signals on one or more of the plurality of antennas in response to mobile-station originated phase adjustment requests, comprising:
  a trellis decoder for determining a phase received in response to the phase adjustment requests, wherein the trellis decoder is a maximum a posteriori (MAP) decoder;
  a phase estimator for estimating phases of pilot signals, the pilot signal phase estimates used in branch metric calculations within the MAP decoder; and
  a phase weight signaling means for producing phase adjustment request messages in response to the pilot signal phase estimates for transmission to the base station and for use in branch metric calculations within the MAP decoder.

* * * * *